Figures 1, 2, 3:
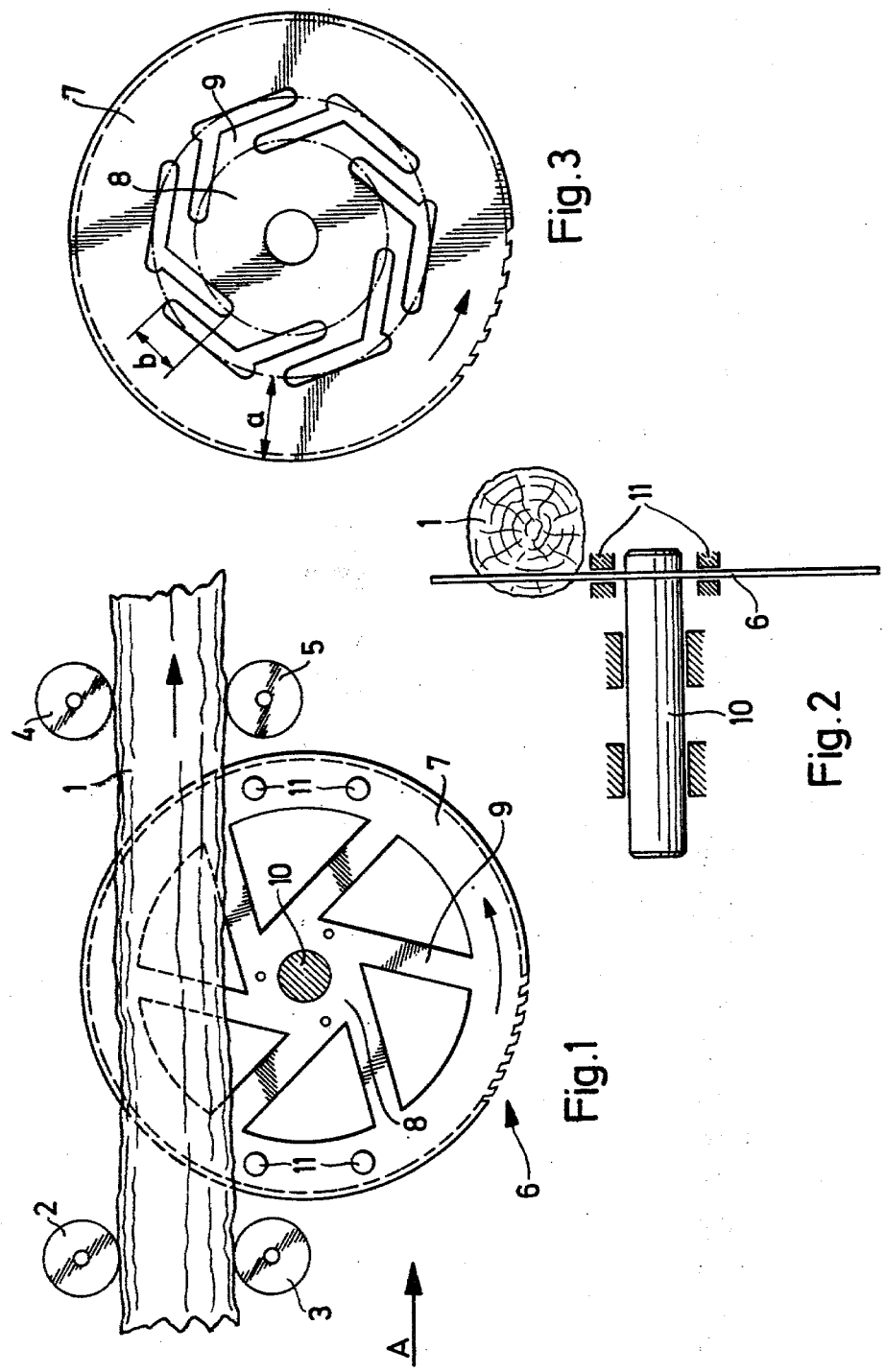

United States Patent [19]

Tuomaala

[11] 4,257,301
[45] Mar. 24, 1981

[54] CIRCULAR SAW BLADE

[75] Inventor: Jorma Tuomaala, Karhula, Finland

[73] Assignee: A. Ahlstrom Osakeyhtio, Noormarku, Finland

[21] Appl. No.: 61,289

[22] Filed: Jul. 27, 1979

Related U.S. Application Data

[63] Continuation-in-part of Ser. No. 911,834, Jun. 2, 1978, abandoned.

[51] Int. Cl.³ .............................................. B27B 33/08
[52] U.S. Cl. ......................................... 83/835; 83/676
[58] Field of Search ................................. 83/835, 676

[56] References Cited

U.S. PATENT DOCUMENTS

| 212,813 | 3/1879 | Miller | 83/835 |
| 1,083,645 | 1/1914 | Wettstein | 83/835 |
| 3,872,763 | 3/1975 | Kayahara | 83/835 |

FOREIGN PATENT DOCUMENTS

| 645494 | 11/1935 | Fed. Rep. of Germany | 83/676 |
| 2625995 | 12/1977 | Fed. Rep. of Germany | 83/835 |
| 2654625 | 6/1978 | Fed. Rep. of Germany | 83/835 |
| 421441 | 3/1974 | U.S.S.R. | 83/676 |

Primary Examiner—Frank T. Yost
Attorney, Agent, or Firm—Bucknam and Archer

[57] ABSTRACT

A series of apertures are formed in a blade of a circular saw which define a plurality of the strips interconnecting the toothed annular peripheral portion and the inside portion of the blade. The strips are dimensioned so as not to hinder the expansion of the peripheral portion and the width of the peripheral portion is so great that its own weight can bring about the required tension due to the centrifugal force when the blade rotates. The width of the peripheral portion is 10–30% of the diameter of the blade and the length of the flexible part of the strips is at least 10% of the diameter of the blade. The flexibility, defined by the formula $$K = (L/B) \times (\sin \alpha / N)$$

in which L=the length of the center line of the flexible portion of the rib and B=the greatest width of the rib of this length, α=the angle between the radius running through the center point of the flexible portion and the tangent of the intersection point of the radius and the center line, N=the number of ribs and K is greater than ⅓.

5 Claims, 3 Drawing Figures

CIRCULAR SAW BLADE

This application is a continuation-in-part of U.S. Ser. No. 911,834 filed June 2, 1978 now abandoned.

The present invention relates to a circular saw blade and more specifically it relates to circular saw blades of the type which comprise a toothed annular peripheral portion, an interior portion and strips connecting these to each other.

Gang saws, circular saws or band saws may be used for sawing timber. In view of the fact that the operation of a gang saw is cyclic, the continuously operating circular and band saws have become more popular because of high yield requirements. Both these types of saw have, however, some disadvantages. When a circular saw blade rotates, it is subjected to centrifugal forces. A state of tension, which may be defined in the form of radial and tangential stresses, arises in the blade. Of these stress directions the radial stress is the more detrimental because it makes the natural vibration frequency of the blade approach the drive speed of the saw. When the vibration frequency of the circular blade coincides with the drive speed, it increases in amplitude, so that the blade diverges from the sawing direction. To obviate this disadvantage, the vibration frequency has been increased to avoid coincidence with the rotational frequency by prestressing the blade. However, when the outer periphery of the blade warms up and the teeth become blunt, the vibration frequency often causes deformation of the blade, because the sides of the blade touch the timber and friction heats and deforms the blade.

In order to minimize this disadvantage, it has been proposed to stretch the blade near the hub by hammering so that the radial stress due to rotation of the blade may be substantially diminished and excess vibration of the blade avoided. For the same purpose it has also been proposed to tension the blade hydraulically by means of an expanding hub. The decrease of the radial stress by these means increases the tangential stress of the blade especially at the outer periphery and this permits the blade to better withstand an increase of temperature of its outer periphery so that the sawing accuracy is improved. This method gives satisfactory results with reasonable blade thicknesses if the peripheral speed of the blade is not too high, i.e. maximum 45–60 meters per second. However, very high peripheral speeds make the hammering difficult and the results are inaccurate so that they do not meet practical requirements. It would be desirable, however, to achieve higher peripheral speeds because they would allow higher feed speeds and higher yields.

It has been suggested to counteract the effect of the rise in temperature during sawing, that is the changes in radial stresses and vibration frequency, by providing the circular saw with a series of apertures in an annular arrangement along the toothed periphery of the blade.

Curved perforations near the center of the blade have been known, for instance they were suggested in U.S. Pat. No. 212,813 which issued in 1879. In U.S. Pat. No. 1,083,645 which issued in 1914, the perforations are located between the center and the toothed edge and are so shaped that the portions between the perforations form curved spokes. Some improvement has been achieved because the slots facilitate the expansion at the periphery.

German Pat. No. 1,959,323 describes the use of eight curved perforations similar to U.S. Pat. No. 1,083,645. German Offenlegungsschrift No. 2,654,625 describes the use of several radial slot-type perforations which are arranged on several diameters and the inner slots are so arranged in relation to the outer slots that the angle between an outer and an inner slot is less than and one-half the angle between two outer slots. One disadvantage resulting from the blade of this patent is that the strips run in the same direction as the rotation and are subjected to compressive stresses by the driving torque.

More recently U.S. Pat. No. 3,872,763 uses a series of apertures in an annular configuration close to the edge and a series of strips connecting the inner portion and the peripheral edge portion, the strips being inclined substantially in the same direction as the inclination of the teeth. The peripheral portion, however is very narrow and the stiffness of the blade decreases. In order to obviate this drawback, the perihperal portion must be made thick, a fact which causes sawing losses. Further, frictional heat is still transmitted to the periphery because the body of the blade is large with respect to the peripheral portion. In conclusion, the improvements achieved by all these proposals have not been substantial and still high feed rates cannot be achieved, deformation is likely to occur with the result that the workpieces have an irregular surface.

An object of the present invention is to provide a circular saw blade which is not subjected to substantial deformation during operation so that the surface of the workpiece is smooth and regular. Still another object is to provide a circular saw blade which does not require to be stiff. Still another object is to provide a circular saw blade which may be operated at high rate, with great accuracy and small material losses.

The crux of the present invention resides in providing a saw blade having a circular outer band which is not necessarily stiff because the required rigidity is achieved by stretching the band in a manner similar to a gang saw or a band saw. The stretching is accomplished as a result of the centrifugal force, so that the peripheral speed is twice as high as the speed of a conventional circular saw.

Characteristic features of the invention are that the strips connecting the interior portion and the peripheral portion do not essentially prevent the peripheral portion from expanding and that the width of the peripheral portion is so great that, due to radial acceleration, the weight of the peripheral portion can give the required tension when the blade rotates. For this purpose the width of the peripheral portion W must be 10.–30%, preferably 15.–25% of the diameter of the blade and the length of the flexible portion of the strips is at least 10% of the diameter of the blade. Because of the small width of the peripheral portion, preferably up to 25% the diameter of the blade, the difference between the tangential stresses on the inside and outside of the peripheral portion caused by the centrifugal force, is small and the tendency to buckling is eliminated.

When the blade rotates, the tangential stress of the peripheral portion is approximately three times greater than the stress in the same area in a conventional circular saw blade. The maximum radial stress, on the other hand, is only about 10% of the corresponding stress in a conventional circular saw blade. No vibration problems arise and the peripheral speed can be increased according to the strength of the material. The tension of the peripheral portion with a blade thickness of about 3 mm, at a peripheral speed of about 100 meters/second is the same as that in a band saw but the static stress is only one third of the stress in a band saw. If one spot of the peripheral portion is heated by friction, the width of the peripheral portion does not hinder the elastic expansion of this spot in radial direction. Tangential expansion only causes an increase of the diameter of the peripheral portion. During sawing, the peripheral portion of the blade must be guided laterally by guides which determine the operation position of the blade. The centrifugal force stretches the blade in the tangential direction and keeps the tension constant. The blade is made out of a circular saw blade by perforating its interior portion so as to form strips which do not hinder expansion or stretching of the peripheral portion but are capable of transmitting to it the rotating force and withstanding the feeding force. In the saw blade of this invention the aperture zone cannot essentially guide the peripheral portion of the blade laterally so that the potential vibrations of the interior portion are not transmitted to the peripheral portion.

Another feature of the present invention is the great flexibility of the blade. Essentially, the band is attached to the shaft through flexible ribs so that the stiffness of the ribs does not considerably prevent the stretching of the band. The flexibility K is defined as follows:

$$K = (L/B) \times (\sin \alpha / N)$$

in which L=the length of the centre line of the flexible portion of the rib and B=the greatest width of the rib of this length; $\alpha$=the angle between the radius running through the centre point of the flexible portion and the tangent of the intersection point of the radius and the centre line; N=the number of ribs. The length L is chosen to be such that together with B, gives the maximum value to the ratio L/B. In addition, the measurements for L and B are taken for the stiffest rib, if there are differences between the ribs. It has been found that if the value of K exceeds $\frac{1}{8}$, the blade is considered to be within the scope of the invention.

The strips may be inclined to the radius through the center point or may be right angles with respect to the radius of the blade through the center point of the strip but must not run in the direction of the rotation so as to be subjected to compressive stresses by the driving torque.

The invention is described hereinbelow in more detail with reference to the enclosed drawings in which FIG. 1 shows a schematic side view of a sawing machine provided with a circular saw blade according to the invention, FIG. 2 shows an apparatus according to FIG. 1 in the direction of the arrow A, FIG. 3 shows an alternative embodiment of a circular saw blade.

In FIGS. 1 and 2 the numeral 1 refers to a timber to be sawn which is fed by the feed roll pairs 2, 3 and 4,5 of the sawing machine. The sawing machine has a circular saw blade 6 consisting of an annular toothed peripheral portion 7 and an interior portion 8 which are connected to each other by strips 9 made of the same blade blank. The strips form an angle with the radius of the blade so as not to hinder the expansion and stretching of the annular peripheral portion. The interior portion of the saw blade is connected to the drive shaft 10 of the sawing machine by known methods. Guiding elements 11 guide the blade laterally.

In the embodiment of the saw blade 6 shown in FIG. 3 the annular toothed peripheral portion 7 and the inside portion 8 are connected to each other mainly by tangential strips 9.

The stresses at different temperatures in a circular saw blade according to FIG. 3 were determined mathematically. The number of revolutions was 1800 4/min. Blade dimensions

| | |
|---|---|
| outer diameter | 1000 mm |
| thickness | 2.8 mm |
| width a of peripheral portion | 190 mm |
| length b of flexible portion of the strips | 220 mm |
| width of the strips | 50 mm. |

It has been shown that due to stiffness of the strips, the tension of the peripheral portion at an even temperature is only 2.6% lower and when the peripheral portion is 100° C. hotter than the interior portion, 13.5% lower than the tension of a freely rotating annular blade. The tensioning force of the periphery is more than 2000 kg which gives it a greater stiffness in the lateral direction than is possible to achieve in an equally thick circular blade. The peripheral portion is kept in the sawing direction by its own tension and by guides located at its sides outside the sawing area. The interior portion increases the lateral stiffness of the connection only to a minimal extent.

By way of comparison, the slot structure presented in FIG. 1 of German Pat. No. 1,959,323 gives the following values: $\alpha = 70°$, B=4 mm, L=7 mm and N=8. Thus the value of the flexibility is $$K = \frac{L}{B} \times \frac{\sin \alpha}{N} = \frac{7}{4} \times \frac{\sin 70°}{8} = 0{,}2056 < \frac{1}{4}$$

A sawing machine provided with a circular saw blade according to the invention has several advantages when compared to a conventional circular saw, namely the peripheral speed may be increased, no hammering is required, the blade may be thinner, the noise level of sawing is decreased due to elimination of vibration, sawing accuracy is superior and the surface quality is better than with other known annular saw blades.

Still another advantage of the saw blade of the present invention is that the structural stiffness of the band is almost insignificant, because it is only 5% of the stiffness caused by the stretching force. On the other hand structural stiffness of the blade in the blades of known circular saws is very substantial when compared to that caused by the stretching force.

When compared with a band saw, the present invention offers the advantages that the peripheral speed and sawing efficiency are higher, there are no dynamic bending stresses, the blade can be made thicker, so that also the static strength is better, sawing accuracy is superior, teeth made of hard metal may be used, due to hard metal teeth and sawing direction the quality of the surface is better, the machine construction is less expensive. The blades and maintenance of blades are also less expensive.

What is claimed is:

1. A circular saw blade comprising a toothed annular peripheral portion and an interior portion, strips connecting said toothed annular peripheral portion to said interior portion, wherein the width of the peripheral portion is 10–30% of the diameter of the blade, said strips having a flexible portion, the length of the flexible portion of the strips is at least 10% of the diameter of the blade, wherein the flexibility K is defined by the formula $K = (L/B) \times (\sin \alpha/N)$ in which L = the length of the center line of the flexible portion of the strip and B = the greatest width of the strip of this length, $\alpha$ = the angle between the radius running through the center point of the flexible portion and the tangent of the center line through the intersection point of the radius and the center line, N = the number of strips and K is greater than $\frac{1}{3}$.

2. The circular saw blade according to claim 1 wherein the width of the peripheral portion is 15–25% of the diameter of the blade.

3. The circular saw blade according to claim 1 wherein the strips are at right angle with respect to the radius of the blade through the center point of the strip.

4. The circular saw blade according to claim 3 wherein the strips run in a direction other than the direction of rotation.

5. The circular saw blade according to claim 1 wherein the strips are inclined to the radius through the center point.

* * * * *